(12) United States Patent
Nurmi et al.

(10) Patent No.: US 7,644,309 B2
(45) Date of Patent: Jan. 5, 2010

(54) RECOVERING A HARDWARE MODULE FROM A MALFUNCTION

(75) Inventors: Juha Nurmi, Salo (FI); Kaj Saarinen, Turku (FI)

(73) Assignee: Nokia Corporation, Espoo (FI)

( * ) Notice: Subject to any disclaimer, the term of this patent is extended or adjusted under 35 U.S.C. 154(b) by 411 days.

(21) Appl. No.: 11/134,836

(22) Filed: May 20, 2005

(65) Prior Publication Data

US 2006/0282711 A1 Dec. 14, 2006

(51) Int. Cl.
*G06F 3/14* (2006.01)
(52) U.S. Cl. .............................. 714/23; 710/19; 714/44; 714/55; 714/56; 345/169
(58) Field of Classification Search .................. 714/24, 714/51.57, 47, 48, 55, 23; 345/169; 710/19
See application file for complete search history.

(56) References Cited

U.S. PATENT DOCUMENTS

| | | | | |
|---|---|---|---|---|
| 4,566,111 A | * | 1/1986 | Tanagawa | 377/28 |
| 5,400,163 A | * | 3/1995 | Mizuochi et al. | 398/79 |
| 5,513,319 A | * | 4/1996 | Finch et al. | 714/55 |
| 5,802,281 A | * | 9/1998 | Clapp et al. | 709/228 |
| 5,864,656 A | * | 1/1999 | Park | 714/10 |
| 5,961,622 A | * | 10/1999 | Hudson et al. | 710/107 |
| 6,370,656 B1 | * | 4/2002 | Olarig et al. | 714/23 |
| 6,584,587 B1 | * | 6/2003 | McDermott | 714/55 |
| 6,816,163 B2 | * | 11/2004 | Antila | 345/545 |
| 2001/0028473 A1 | * | 10/2001 | Yamasaki et al. | 358/1.15 |
| 2001/0038387 A1 | * | 11/2001 | Tomooka et al. | 345/520 |
| 2002/0080134 A1 | * | 6/2002 | Antila | 345/213 |
| 2002/0116670 A1 | * | 8/2002 | Oshima et al. | 714/55 |
| 2003/0177428 A1 | * | 9/2003 | Wakabayashi et al. | 714/741 |
| 2004/0012580 A1 | * | 1/2004 | Yamagishi et al. | 345/204 |
| 2004/0034816 A1 | * | 2/2004 | Richard | 714/39 |
| 2004/0078666 A1 | * | 4/2004 | Aasheim et al. | 714/24 |
| 2005/0246567 A1 | * | 11/2005 | Bretschneider et al. | 714/2 |

* cited by examiner

*Primary Examiner*—Nadeem Iqbal
*Assistant Examiner*—Chae Ko
(74) *Attorney, Agent, or Firm*—Alfred A. Fressola; Ware, Fressola, Van Der Sluys & Adolphson LLP

(57) ABSTRACT

The invention relates to a recovery of a hardware module of an electronic device from a malfunction state. The hardware module is connected via a signal line to a recovery component of the device, a state of the signal line being controlled by the hardware module. The recovery component monitors a state of the signal line. Whenever the signal line is detected not to assume a predetermined state during a predetermined period of time, the recovery component causes a hardware reset of the hardware module.

9 Claims, 2 Drawing Sheets

RECOVERING A HARDWARE MODULE FROM A MALFUNCTION

FIELD OF THE INVENTION

The invention relates to a method for recovering a hardware module of an electronic device from a malfunction state, to a recovery component for an electronic device, to a corresponding electronic device, and to a corresponding software program product.

BACKGROUND OF THE INVENTION

Many electronic devices comprise a screen which enables a presentation of information to a user of the device.

Typically, the screen forms a part of a display module, which comprises in addition a display driver. The display driver includes a frame memory storing the data for a current image which is to be displayed on the screen. The presentation on the screen is updated by the display driver position by position with data from the frame memory. The image data for a respective frame is usually provided to the display driver by a host. The host, as the main processing unit of the electronic device, may run applications requiring a presentation of images via the screen.

The display driver may provide the host with information on the currently updated position of the screen via a signal line, in order to allow the host to synchronize with the display driver. Synchronization is typically employed for critical moving image applications, like game and video applications. The position information can be generated for example from display module internal synchronization signals, in particular from a horizontal and a vertical synchronization signal. The vertical synchronization signal may be valid at the beginning of a frame, and the horizontal synchronization signal may be valid at the beginning of each line. In combination, these signals thus provide information on the current position.

The signal line may be activated by the display driver, for example, whenever a new frame in a moving image application is needed. In the host, an interrupt is generated from the active signal line, which initiates a Direct Memory Access (DMA) transfer of a further image to the display module.

Alternatively, the signal line may also be omitted. In this case, the data for a respective frame is transmitted without synchronization from the host to the frame memory.

The presentation on the screen may be subject to malfunctions. A malfunction can be caused by various external influences, like electrostatic discharge (ESD) pulses, electrical glitches, power shortages, etc.

External influences may change for example one bit or several bits in control registers of the display module. Further, they may corrupt images which are currently transferred via an internal bus in the display module. Moreover, external influences may stop for example a powering circuit or a timing circuit in the display module. Such disturbances may result in a blank display, in a presentation of corrupted data on the screen, or in a change of mode of the display.

So far, it is only possible to detect a malfunction of a display by means of a visual check.

In order to ensure a correct presentation nevertheless, software run by the host typically sends a refresh sequence to the display driver at regular intervals, for example every three seconds. The refresh sequence is used to rewrite all registers of the display module and the image data currently stored in the frame memory.

A software refresh, however, is not suited to recover a display from all possible malfunctions which may be caused by external influences. For example, if the powering circuit is affected such that it entered an abnormal state, a register refresh by software does not fix the error.

Such malfunctions in a display module can usually only be removed by rebooting the electronic device or by means of a separate hardware reset of the display driver.

In contrast to a software refresh, however, a hardware reset is not suited to be performed automatically on a regular basis, because a hardware reset causes visual effects on the screen. If a hardware reset was performed every three seconds, for example, this would result in a blank display every three seconds, which would be annoying to a user.

It is to be understood that a similar problem may occur with other hardware modules than a display module, if they are subject to external influences.

SUMMARY OF THE INVENTION

It is an object of the invention to enable an improved recovery of a hardware module from a malfunction state.

A method is proposed for recovering a hardware module of an electronic device from a malfunction state. The hardware module is connected via a signal line to a recovery component of the electronic device, a state of the signal line being controlled by the hardware module. The proposed method comprises at the recovery component monitoring a state of the signal line. The proposed method further comprises at the recovery component causing a hardware reset of the hardware module, whenever the signal line is detected not to assume a predetermined state during a predetermined period of time.

Moreover, a recovery component for an electronic device is proposed. The proposed recovery component is adapted to be connected via a signal line to a hardware module of the electronic device. The proposed recovery component is moreover adapted to monitor a state of the signal line and to cause a hardware reset of the hardware module whenever the signal line is detected not to assume a predetermined state during a predetermined period of time.

Moreover, an electronic device is proposed, which comprises a hardware module and a recovery component connected to each other via a signal line. The hardware module is adapted to set the signal line at regular intervals to a predetermined state as long as no malfunction occurs in the hardware module. The recovery component is adapted to monitor a state of the signal line and to cause a hardware reset of the hardware module whenever the signal line is detected not to assume the predetermined state during a predetermined period of time.

Finally, a software program product is proposed, which stores a software code for recovering a hardware module of an electronic device from a malfunction state. The hardware module is assumed to be connected via a signal line to a recovery component of the electronic device, a state of the signal line being controlled by the hardware module. When running in the recovery component, the software code realizes the steps of the proposed method.

The invention proceeds from the consideration that a hardware module is able to control the state of a signal line. It may cause a predetermined state of the signal line at regular intervals. It has to be understood that the intervals do not have to have exactly the same length, but they should not exceed a predetermined length. When a malfunction occurs in the hardware module, changing the state of the signal line may be prevented. A non-appearance of the predetermined state of such a signal line for a certain period of time can then be considered as an indication of a malfunction in the hardware module. It is therefore proposed that in case of a non-appearance of the predetermined state of a signal line, a hardware reset of the hardware module is caused.

It is an advantage of the invention that a malfunction in a hardware module can be detected and eliminated without a repeated software refresh. As a result, the power which is required for the repeated software refreshes is saved. The caused hardware reset results in a more comprehensive recovery than a software refresh. Since the hardware reset is only used when needed, disturbing effects are avoided.

The hardware module according to the invention can be any hardware module which may suffer from malfunctions, for instance a display module like a liquid crystal display (LCD) module. The electronic device according to the invention can be any device comprising such a hardware module, for example a mobile terminal including an LCD module.

In some electronic devices, a signal line which is controlled by a hardware module is already implemented. Such a signal line may then be used advantageously in addition for the invention.

In case the hardware module is a display module, for example, the signal line may be further connected to a frame control portion. The frame control portion is adapted to detect a predetermined state of the signal line as a synchronization signal for providing image data to the display module.

The hardware module of the invention may be adapted to stop setting the signal line to a predetermined state for various malfunction reasons. Setting the signal line to the predetermined state may be stopped, for instance in case a bit in a control register of the hardware module changed without cause within the hardware module, in case data in an internal bus of the hardware module is corrupted, or in case a powering circuit of the hardware module has been stopped.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
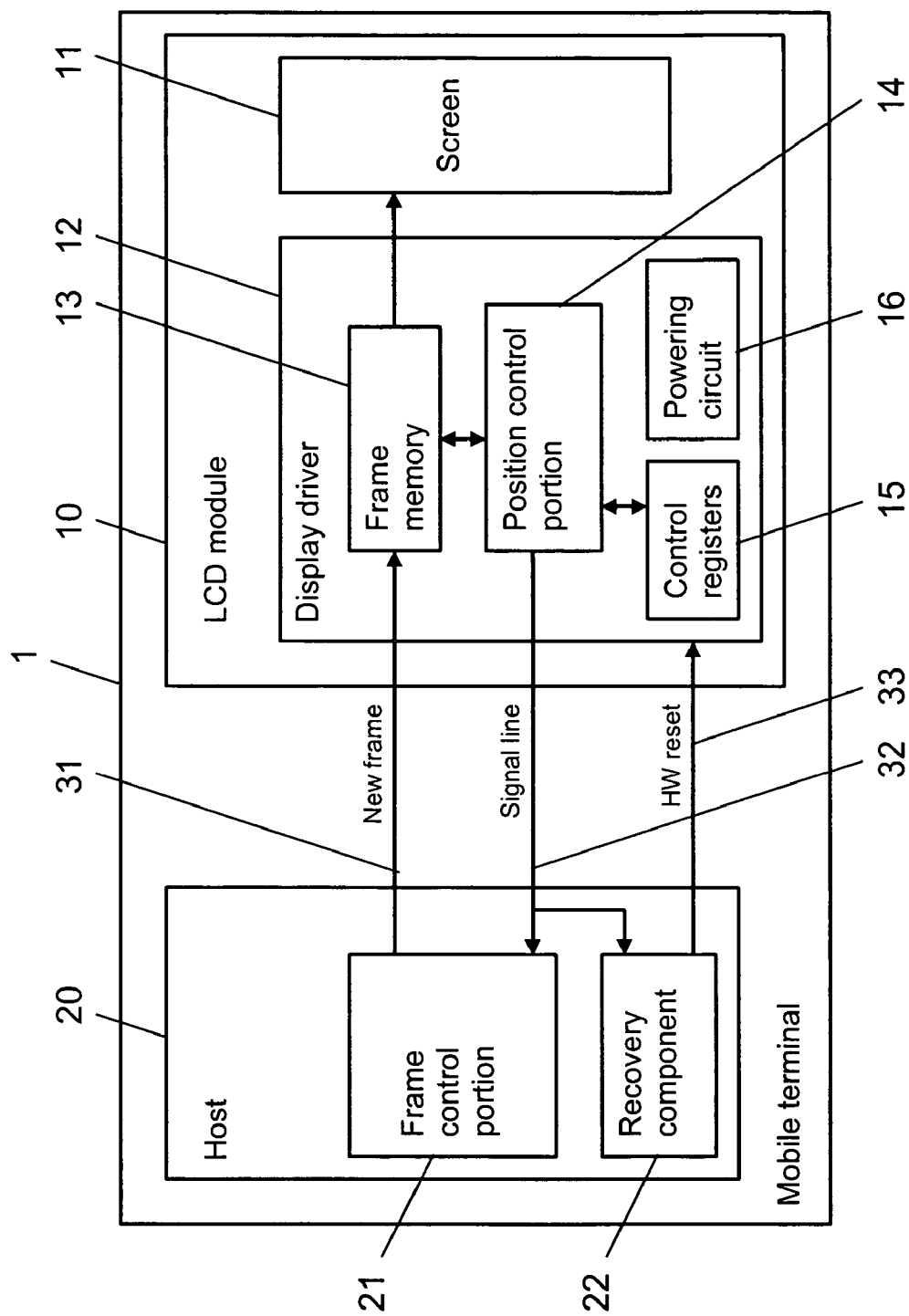
FIG. 1 is a schematic block diagram of an electronic device according to an embodiment of the invention.

FIG. 1 schematically presents a mobile terminal as an electronic device, in which a recovery from a malfunction of a hardware module in accordance with an embodiment of the invention is implemented.

The mobile terminal 1 can be for example a conventional mobile phone, which includes among other components an LCD module 10 as a hardware module and a host 20.

The LCD module 10 comprises a screen 11 and a display driver 12. The display driver 12 may be connected to the screen 11 by an internal bus. The display driver 12 comprises among other components a frame memory 13, a position control portion 14, control registers 15 and a powering circuit 16. The powering circuit 16 is connected to the battery voltage and takes care of providing the components of the LCD module 10 with an appropriate power.

The host 20 includes among other components a frame control portion 21 and a recovery component 22.

The frame control portion 21 is connected via a data bus 31 to an input of the frame memory 13 of the display driver 12. A signal line 32 moreover connects the position control portion 14 on the one hand with the frame control portion 21 and on the other hand with the recovery component 22. The recovery component 22 is further connected via an HW reset line 33 with the LCD module 10.

A recovery from a malfunction of the mobile terminal 1 due to an external influence, like an ESD pulse, will now be described with reference to the flow chart of FIG. 2.

Figure 2:
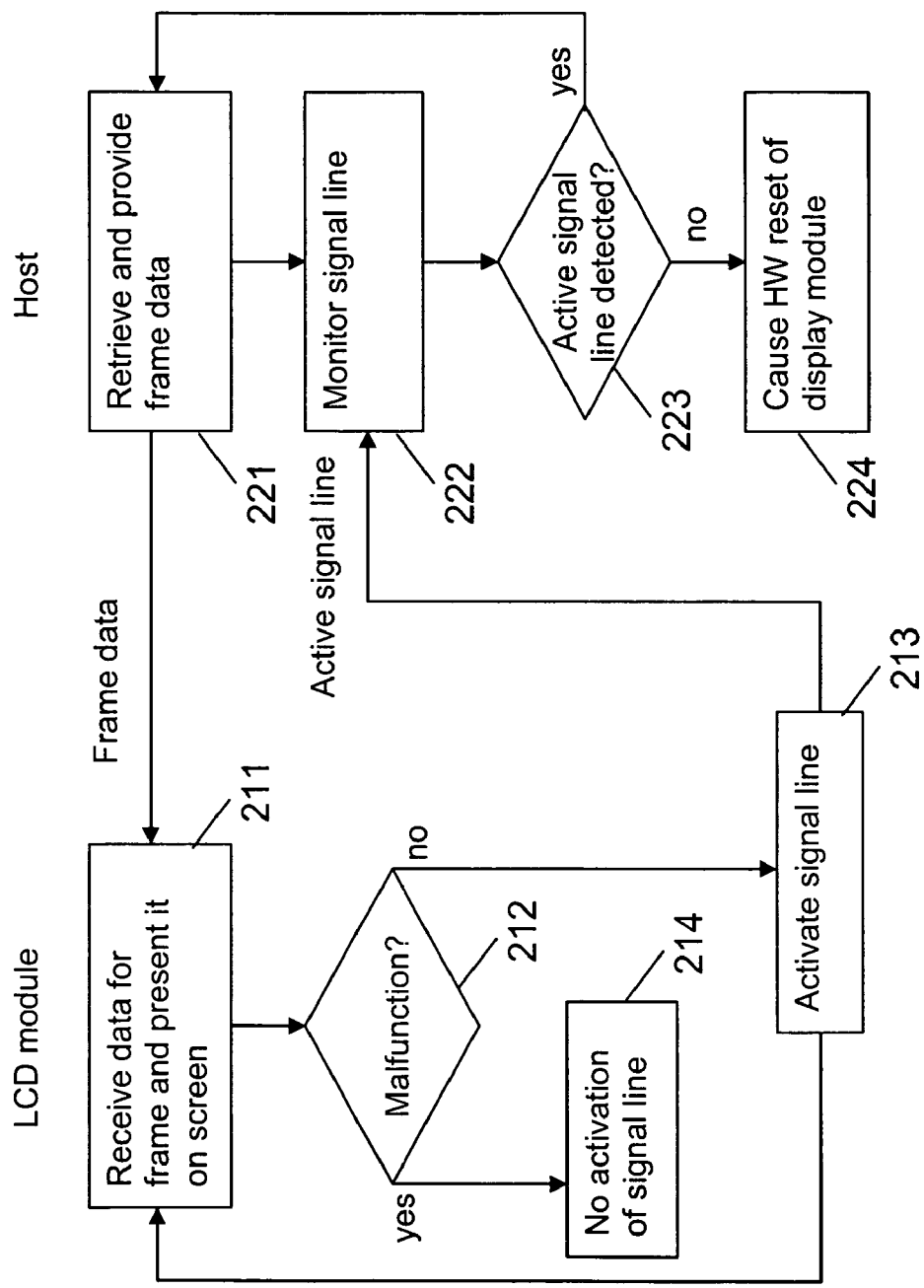
FIG. 2 is a flow chart illustrating an operation in the device of FIG. 1.

FIG. 2 illustrates on the left hand side the operation of the LCD module 10 and on the right hand side the operation of the host 20.

The host 20 runs an application (not shown), like a game, which requires a presentation of moving images on the screen 11. The frame control portion 21 of the host retrieves data for the respectively required frame from some memory of the mobile terminal 1 (not shown) and provides it to the LCD module 10 via the data bus 31. (step 221)

The display driver 12 of the LCD module 10 buffers the data of a received frame in its frame memory 13. The frame is then presented position by position on the screen 11 with data from the frame memory 13 and under control of the position control portion 14. The position control portion 14 uses to this end a horizontal and a vertical synchronization signal. (step 211)

When the update of the screen 11 based on the currently buffered frame data has been completed and no malfunction occurred (step 212), the position control portion 14 activates the signal line 32 (step 213). To this end, the voltage on the signal line 32, which is low by default, is temporarily set to a higher value.

Meanwhile, the frame control portion 21 and the recovery component of the host 20 monitor the signal line 32 (step 222).

The frame control portion 21 considers an active signal line 32 in a conventional manner as a synchronization signal, that is, as an indication that data for a new frame is required in the display driver 12 for updating the screen 11. Whenever the frame control portion 21 detects an activation of the signal line 32, it thus provides the data for the next frame to the LCD module 10 (step 221). The LCD module 10 continues thereupon updating the presentation on the screen 11, now based on the new data in the frame memory 13 (step 211). Steps 211 through 213 and 221 through 223 are repeated in a loop, as long as no malfunction occurs and as long as a further frame is requested to be presented by the application running in the host 20.

In case a malfunction occurs (step 212), in contrast, the signal line 32 is not activated any more (step 214). The cause of the malfunction may be for example a change of bits in the control registers, a corrupted image on an internal bus or a stopped powering circuit. The malfunction may cause for example a blank display, corrupted data on the screen or a mode change of the display.

In case the frame control portion 21 does not detect an activation of the signal line 32 within twice the refresh period (223), the frame control portion 21 omits the frame which is currently to be transferred to the frame memory 13 and waits for a new frame from the running application. Visually, this can be seen as a stuck camera viewfinder or video.

When the recovery component 22 detects that the signal line 32 is not activated on a regular basis within a predetermined period of time (step 223), it assumes a malfunction to be present in the display driver 12.

In this case, the recovery component 22 causes a hardware reset of the display driver 12 by sending an interrupt to the display driver 12 via HW reset line 33 (step 224). As a result of the subsequent hardware reset, any recoverable malfunction is removed.

Thus, a regular software refresh by way of precaution is not required anymore. This allows saving battery power in the mobile terminal 1. Nevertheless, a malfunction is recovered immediately and comprehensively in an automatic manner whenever required.

In the presented embodiment of a mobile terminal, a signal line 32 as such is present anyhow for conventional synchronization purposes. It is simply used in addition in accordance with the invention for the purpose of enabling a recovery of an LCD module from a malfunction. It is to be understood that if an electronic device does not comprise a signal line for synchronization purposes, such a signal line may be provided specifically for the purpose of enabling a recovery of a display module from a malfunction in accordance with the invention.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   monitoring a state of a signal line at a recovery component of an electronic device, wherein a first hardware module of said electronic device is directly connected with said recovery component via said signal line and the state of said signal line is controlled by said first hardware module; and
   actively causing a hardware reset of said first hardware module by said recovery component, whenever said signal line is detected not to assume a predetermined state during a predetermined period of time,
   wherein said first hardware module is directly connected to a second hardware module via said signal line so as to inform said second hardware module whenever said signal line is detected to assume a predetermined state.

2. A recovery component for an electronic device,
   configured to be directly connected to a hardware module of said electronic device via a signal line; and
   configured to monitor a state of said signal line, based upon said hardware module, and to actively cause a hardware reset of said hardware module whenever said signal line is detected not to assume a predetermined state during a predetermined period of time,
   wherein said hardware module is directly connected to a second hardware module via said signal line so as to inform said second hardware module whenever said signal line is detected to assume a predetermined state.

3. An apparatus comprising
   a first hardware module
   a second hardware module, and
   a recovery component directly connected to said first hardware module via a signal line,
   wherein said first hardware module is configured to set said signal line at regular intervals from a first predetermined state to a second predetermined state as long as no malfunction occurs in said hardware module;
   said recovery component is configured to monitor a state of said signal line and to actively cause a hardware reset of said first hardware module whenever said signal line is detected not to assume said second predetermined state during a predetermined period of and
   said first hardware module is directly connected to said second hardware module via said signal line so as to inform said second hardware module whenever said signal line is detected to assume said second predetermined state.

4. The apparatus according to claim 3, wherein said first hardware module is a display module comprising a display driver for a screen.

5. The apparatus according to claim 3, wherein said second hardware module is a frame control portion, which frame control portion is configured to detect said second predetermined state of said signal line as a synchronization signal for providing data to said first hardware module.

6. The apparatus according to claim 3, wherein said first hardware module is configured to stop setting said signal line at regular intervals from said first predetermined state to said second predetermined state in case at least one of the following occurs: a bit in a control register of said first hardware module changes without cause within said first hardware module data in an internal bus of said first hardware module is corrupted, and a powering circuit of said first hardware module has stopped.

7. The apparatus according to claim 3, wherein said apparatus comprises a host, and wherein said recovery component is a part of said host.

8. A software program product stored with program code, which when executed by a recovery component, causes said recovery component to perform:
   monitoring a state on a signal line, the state of said signal line being controlled by a first hardware module of an electronic device that is subject to a malfunction state, wherein said first hardware module is directly connected via the signal line to said recovery component of said electronic device; and
   actively causing a hardware reset of said first hardware module whenever said signal line is detected not to assume a predetermined state during a predetermined period of time,
   wherein said first hardware module is directly connected to a second hardware module via said signal line so as to inform said second hardware module whenever said signal line is detected to assume said predetermined state.

9. A recovery component for an electronic device comprising:
   means for directly connecting said recovery component via a signal line to a first hardware module of said electronic device;
   means for monitoring a state of said signal line, based upon said first hardware module, and
   means for actively causing a hardware reset of said first hardware module whenever said signal line is detected not to assume a predetermined state during a predetermined period of time,
   wherein said first hardware module is directly connected to a second hardware module via said means for connecting so as to inform said second hardware module whenever said signal line is detected to assume said predetermined state.

* * * * *

UNITED STATES PATENT AND TRADEMARK OFFICE
CERTIFICATE OF CORRECTION

PATENT NO. : 7,644,309 B2
APPLICATION NO. : 11/134836
DATED : January 5, 2010
INVENTOR(S) : Nurmi et al.

Page 1 of 1

It is certified that error appears in the above-identified patent and that said Letters Patent is hereby corrected as shown below:

1. At column 5, line 62, claim 3, line 2, please insert --,-- after the word "module".

2. At column 6, line 7, claim 3, line 14, please insert --time;-- after the word "of".

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,644,309 B2
APPLICATION NO. : 11/134836
DATED : January 5, 2010
INVENTOR(S) : Nurmi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this

Twenty-first Day of December, 2010

David J. Kappos
*Director of the United States Patent and Trademark Office*